Jan. 19, 1926.
A. J. CORMIER
1,570,043
PUMP PACKING EXPANDING DEVICE
Filed August 27, 1924
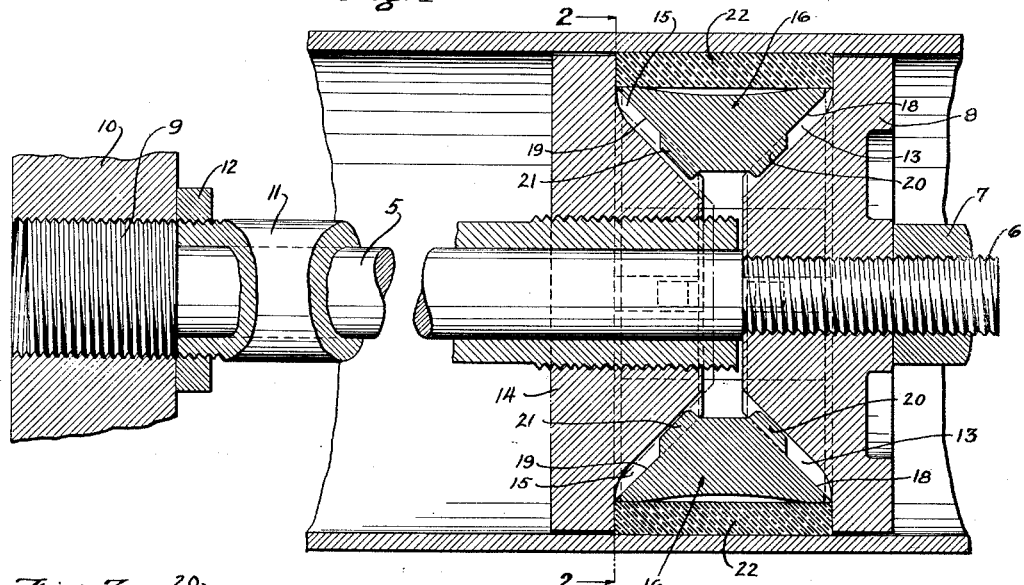
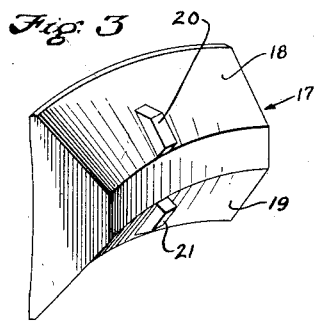
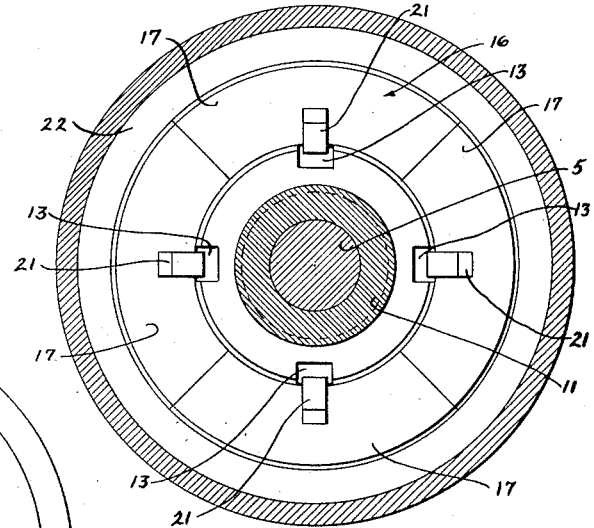
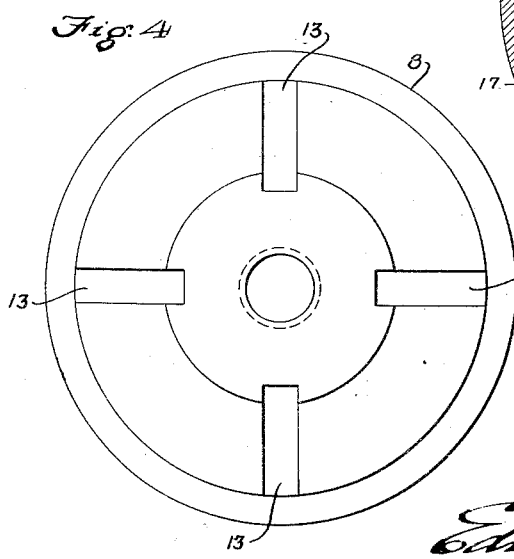
INVENTOR
ALFRED JULES CORMIER
BY
*Edward A. Thurze*
ATTORNEY Patented Jan. 19, 1926.

1,570,043

UNITED STATES PATENT OFFICE.

ALFRED JULES CORMIER, OF LOS ANGELES, CALIFORNIA, ASSIGNOR TO A. W. WARR, OF LOS ANGELES, CALIFORNIA.

PUMP-PACKING-EXPANDING DEVICE.

Application filed August 27, 1924. Serial No. 734,415.

*To all whom it may concern:*

Be it known that I, ALFRED JULES CORMIER, a citizen of the United States, residing at Los Angeles, in the county of Los Angeles and State of California, have invented a new and useful Pump-Packing-Expanding Device, of which the following is a specification.

This invention relates more specifically to a mechanism for expanding the pump packings of pistons of the type shown and described in my application for Letters Patent bearing Serial Number 653,612, filed July 24, 1923, and refers to an improved mechanism for preventing the movable coniform piston element from rotating during its reciprocatory expanding movement.

The important object of this invention as in the application above referred to, is to provide an expanding mechanism for pump pistons in which the packing element can be readily expanded during the operation of the pump.

A further object is to provide means for evenly expanding the packing element so that its outer peripheral surface tightly contacts with the cylinder wall on an expanding movement.

The expanding mechanism preferably consists of a pair of coniform oppositely disposed piston heads, one of said heads being rigidly secured to the piston rod and the other reciprocatingly mounted on an operating sleeve disposed on the piston rod, a sectional metal ring triangular in cross section being disposed between the heads, the outer annular surface of the sectional ring bearing against the inner peripheral surface of an expansible packing element. A plurality of keys formed on the angular faces of the ring sections and engaging keyways formed in the conical walls of the piston heads, prevents the movable head from rotating during its expanding movement.

Further objects and advantages will be apparent as the description proceeds, reference being had to the drawings accompanying the same, in which:

Fig. 1 is a central longitudinal section through a portion of a pump cylinder showing the piston packing means mounted therein.

Fig. 2 is a cross section taken on line 2—2 of Fig. 1, looking in the direction indicated by the arrows.

Fig. 3 is a perspective view of one of the sections of the packing expanding ring.

Fig. 4 is a face view of one of the piston heads, showing the key engaging slots formed in its conical face.

In the drawings attached hereto, 5 designates a piston rod having a reduced threaded outer end 6 for the reception of a lock nut 7, for rigidly securing the stationary coniform piston element 8 thereto. The opposite end 9 of rod 5 is enlarged and threaded for engaging the pump cross head 10. Disposed on pump rod 5 is a sleeve 11 exteriorly threaded at both ends, one end terminating at the inner end of the reduced threaded portion 6 of the piston rod 5, while its opposite end abuts against the enlarged threaded end 9 of the rod, a lock nut 12 preventing an accidental rotation of the sleeve after the mechanism has been assembled in position in the pump cylinder. The stationary piston head element 8 is coniform in configuration, and its conical face is provided with a plurality of radially disposed keyways 13, here shown as four in number. Reciprocatingly mounted on the inner threaded end of sleeve 11, is a coniform piston element 14, its conical face being disposed opposite to the conical face of the stationary piston element 8, and provided in its conical face with keyways 15 like the conical face of element 8.

Mounted in the space formed between the piston elements 8 and 14, is a metallic packing expanding ring 16, divided into a plurality of segmental sections 17, substantially triangular in cross section, each of their angular faces 18, 19, being provided with projecting keys or lugs 20, 21, polygonal in form, that engage the keyways 13, 14, formed in the coniform piston elements when the device is assembled.

Surrounding the sectional expanding ring 16 is a packing ring 22, formed of rubber or similar expansible material. The width of the circular expansible packing ring is slightly greater than the width of the sectional expanding ring 16 in order to provide for an expanding movement of the packing ring. The outer peripheral surface of the ring is also slightly concaved to provide for the lateral expansion of the packing ring when the movable piston element is moved inwardly towards the stationary piston element.

When the packing expander element mechanism is assembled in the pump, and it is desired to expand the ring 22 so that its outer peripheral wall tightly engages the inner cylindrical wall of the pump liner 25, the lock nut 12 is loosened and a pipe wrench is applied to the sleeve 11 to rotate the same, to cause a reciprocation of the movable piston element 14 forwardly. As said element is forced forwardly towards the stationary piston element 8, the sections 17 of the packing expanding ring 16, are moved outwardly and away from each other to force the packing ring into a fluid tight engagement with the cylindrical wall of the pump liner, at the same time the movable piston element compresses the packing ring 22 between the two piston elements, the concaved outer surfaces of the ring sections providing for the transverse compressions of the ring. By providing keys or lugs on the ring sections that engage with the keyways formed on the conical surfaces of the piston elements, the rotation of the piston element is effectually prevented on a reciprocatory movement of the movable piston element. When the packing ring 22 has been expanded to the desired extent the lock nut 12 on the sleeve 11 is tightened to prevent an accidental rotation of the sleeve during the operation of the pump.

From the above it will be apparent that I have provided an extremely simple mechanism for preventing a rotary movement of the movable piston element during its reciprocation, dispensing with the use of bolts, sockets, rings, and like parts employed in connection with my first construction described in my heretofore mentioned application for patent.

What I claim is:

1. In a piston packing expander the combination of a piston rod, of a stationary coniform piston element carried thereby having a plurality of radially disposed keyways formed on its conical face, a sleeve carried by said piston rod having an exterior threaded end portion, a movable coniform piston element having a plurality of radially disposed keyways formed on its conical face mounted on the threaded end of said sleeve, an expansible packing mounted in the space between said coniform piston elements, and a plurality of packing expanding members having inclined inner walls arranged behind said packing and between said piston elements for expanding said packing on a forward movement of said movable piston element, said inclined walls of each expanding member being provided with a key for engaging the keyways formed on the piston elements to prevent a turning movement of the movable piston element.

2. In a piston packing expander the combination of a piston rod, of a stationary coniform piston element carried thereby, a sleeve having an exteriorly threaded end mounted on said piston rod, a movable coniform piston element engaging the threaded end of said sleeve and carried thereby, an expansible packing element mounted in the space between said piston elements, a sectional expanding ring disposed behind said packing element for expanding the same on a movement of said movable piston element, and means formed on said ring and engaging said piston elements to prevent a turning movement of the movable element during an expanding operation.

3. In a piston packing expander the combination of a piston rod, of a stationary coniform piston element carried thereby, a rotatable sleeve having an exteriorly threaded end mounted on said piston rod, a movable coniform piston element engaging the threaded end of said sleeve, said movable piston element adapted to be reciprocated on a rotation of the rotary sleeve, a packing mounted between the opposed coniform faces of said piston elements, a packing expanding means mounted behind said packing, and means formed on the packing expanding means and engaging the piston elements to prevent a rotation of the movable piston element on a reciprocation.

4. In a piston packing expander the combination of a piston rod, of a stationary coniform piston element provided with keyways carried thereby, a sleeve carried by said piston rod, a reciprocating coniform piston element provided with keyways mounted on said sleeve and in threaded relation therewith, an expansible element mounted in the space behind said piston element, an expanding means disposed behind said packing element for expanding the same on a forward reciprocation of said last named piston element, and keys formed in said expanding means for engaging the keyways of the piston elements for preventing a rotation of said movable piston element.

5. In a piston packing expander the combination of a piston rod, of a stationary coniform piston head carried thereby, a sleeve mounted on said piston rod, a movable coniform piston element in threaded engagement with said sleeve, an expansible packing mounted between the coniform piston members, a plurality of packing members mounted between said piston members and behind said expansible packing, whereby on a forward rotation of said sleeve the movable piston element will be reciprocated to operate said expanding members to expand said packing, and means formed on said expanding members and engaging said movable piston element to prevent a rotary movement of the same when the sleeve is rotated.

In witness that I claim the foregoing I have hereunto subscribed my name this 1st day of August, 1924.

ALFRED JULES CORMIER.